United States Patent [19]

Koyama et al.

[11] Patent Number: 5,584,098
[45] Date of Patent: Dec. 17, 1996

[54] OPERATING KNOB-MOUNTING STRUCTURE

[75] Inventors: Akira Koyama; Hiroshi Suyama; Katsuaki Suzuki, all of Aichi-ken, Japan

[73] Assignee: Toyoda Gosei Co., Ltd., Aichi-ken, Japan

[21] Appl. No.: 390,313

[22] Filed: Feb. 17, 1995

[30] Foreign Application Priority Data

Feb. 21, 1994 [JP] Japan .................................. 6-022878

[51] Int. Cl.⁶ ............................... G05G 5/06; B60H 1/00
[52] U.S. Cl. ............. 16/121; 16/DIG. 30; 16/DIG. 24; 74/553; 403/340; 454/152; 454/155; 454/322
[58] Field of Search ................... 16/121, 126, 117, 16/DIG. 30, DIG. 24, DIG. 40; 74/553; 403/340; 454/152, 155, 322, 333

[56] References Cited

U.S. PATENT DOCUMENTS

| | | | |
|---|---|---|---|
| 3,390,903 | 7/1968 | Sabonis | 16/121 |
| 4,791,828 | 12/1988 | Kaye | 16/121 |
| 4,893,426 | 1/1990 | Bixler | 403/348 |
| 5,069,112 | 12/1991 | Takayama et al. | 454/155 |
| 5,233,912 | 8/1993 | Mueller | 403/348 |

FOREIGN PATENT DOCUMENTS

| | | | |
|---|---|---|---|
| 59-70813 | 5/1984 | Japan . | |
| 62-13955 | 1/1987 | Japan | 454/155 |
| 62-190351 | 8/1987 | Japan | 454/155 |

Primary Examiner—M. Rachuba
Assistant Examiner—Donald M. Gurley
Attorney, Agent, or Firm—Cushman Darby & Cushman IP Group of Pillsbury Madison & Sutro, LLP

[57] ABSTRACT

An operating knob-mounting structure in an air-conditioner for vehicle includes a support shaft provided on an equipment and an operating knob having a boss provided with an axial hole formed therethrough, the operating knob being rotatable and supported on the supported shaft fitted in the axial hole. The support shaft has an engagement portion formed thereon and engageable with an outer end face of the boss of the operating knob. The axial hole of the boss has an insertion recess formed in a periphery thereof and allowing the engagement portion to pass therethrough in a direction of an axis of the support shaft when the operating knob is mounted on said support shaft.

8 Claims, 4 Drawing Sheets

5,584,098

OPERATING KNOB-MOUNTING STRUCTURE

BACKGROUND OF THE INVENTION

1. Field of the Invention

This invention relates to a structure for mounting an operating knob in an air-conditioner for a vehicle. The structure is useful for adjusting the amount of outside or the inside air introduced into the passenger compartment of a vehicle.

2. Description of the Related Art

Generally, in an air-conditioner of the type mounted on a vehicle, a ventilation duct is mounted in instrument panel. An air port is provided at a downstream end of the ventilation duct. Outside air or inside air, as desired, is introduced into the passenger compartment of the vehicle through the air port. A shut-out damper is provided in the ventilation duct and movable between open and closed positions to allow or interrupt the introduction of the air. The shut-out damper is connected to an operating knob, which opens and closes the damper by rotational operation. The operating knob is mounted on the ventilation duct in the following manner.

As shown in FIG. 7, a boss 31 provided to the operating knob 30 is fitted on a shaft 33 projecting from an outer side surface of the ventilation duct 32 so as to cover the shaft 33. A tapping screw 34 passes through a washer 35 and the boss 31, and is threaded into the shaft 33. The tapping screw 34 cuts threads on an inner peripheral surface of a screw hole 33a in the shaft 33 so as to be fixedly secured to the shaft 33. With this construction, the operating knob 30 is supported on the shaft 33 to be rotatable about the shaft 33 and is unable to break away from the shaft 33.

In the above conventional mounting structure, however, the tapping screw 34, the washer 35 and the like are required for mounting the operating knob 30 on the ventilation duct 32. Further, the operation of passing the tapping screw 34 through the washer 35 and the boss 31, as well as the operation of threading the tapping screw 34 into the internally-threaded portion 33a in the shaft 33, is required. As a result, the processes, i.e., the time and labor, required for the mounting operation increase so as to increase the production cost and otherwise make the mounting operation troublesome.

SUMMARY OF THE INVENTION

The present invention resolves the above problems. In particular, it is an object of the invention to provide a structure capable of mounting an operating knob in an air-conditioner for a vehicle, in which the number of component parts is reduced, and the processes required for the mounting operation is decreased, thereby reducing the production cost. It is a further object that the operating knob can be easily mounted on a support shaft.

According to the present invention, there is provided an operating knob-mounting structure in an air-conditioner for a vehicle. The structure comprises a support shaft provided on equipment, and an operating knob including a boss having an axial hole formed therethrough, the operating knob being rotatable and supported on the support shaft fitted in the axial hole. The support shaft has an engagement portion formed thereon and is engageable with an outer end face of the boss of the operating knob. The axial hole of the boss has an insertion recess formed in a periphery thereof which allows the engagement portion to pass therethrough in a direction of an axis of the support shaft when the operating knob is mounted on the support shaft.

In one preferred form of the invention, the engagement portion projects radially from the support shaft, and the insertion recess is disposed at a position non-corresponding to the engagement portion in the range of operational rotation of the operating knob during the operation of the operating knob.

In this construction, by engaging the engagement portion with the insertion recess, the boss may be fitted on the support shaft. After the boss is thus fitted on the support shaft, the insertion recess is displaced relative to the engagement portion. As a result, the insertion recess is brought out of registry with the engagement portion, so that the engagement portion is engaged with the outer end face of the boss.

Additionally, in the range of operational rotation of the operating knob during operation, the engagement portion is disposed at a position non-corresponding to the insertion recess. Therefore, the operating knob is prevented from being disengaged from the support shaft not only radially of the support shaft but also axially of the support shaft.

BRIEF DESCRIPTION OF THE DRAWINGS

Other objects, features, and characteristics of the present invention will become apparent upon consideration of the following description in the appended claims with reference to the accompanying drawings, all of which form a part of the specification, and wherein referenced numerals designate corresponding parts in the various figures.

DESCRIPTION OF THE PREFERRED EMBODIMENTS

One preferred embodiment of the present invention will now be described with reference to the drawings.

Figure 1:
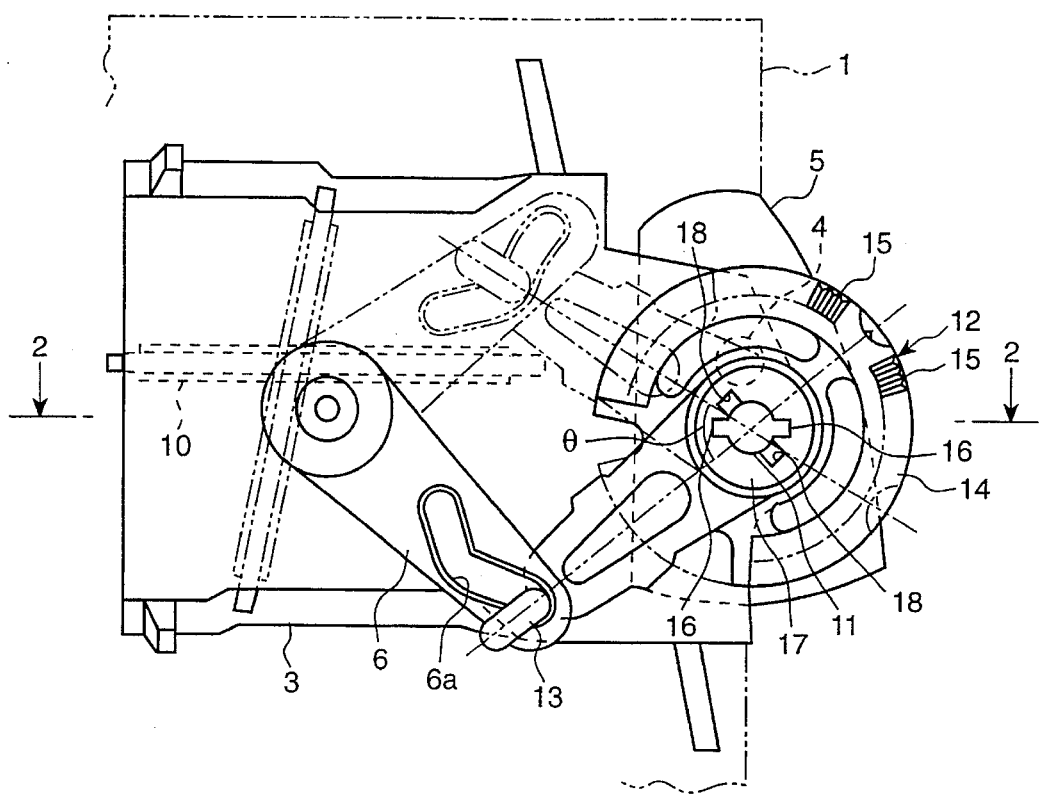
FIG. 1 is a side-elevational view of a preferred embodiment of the present invention, showing a condition in which an operating knob is mounted on a support shaft.
Figure 2:
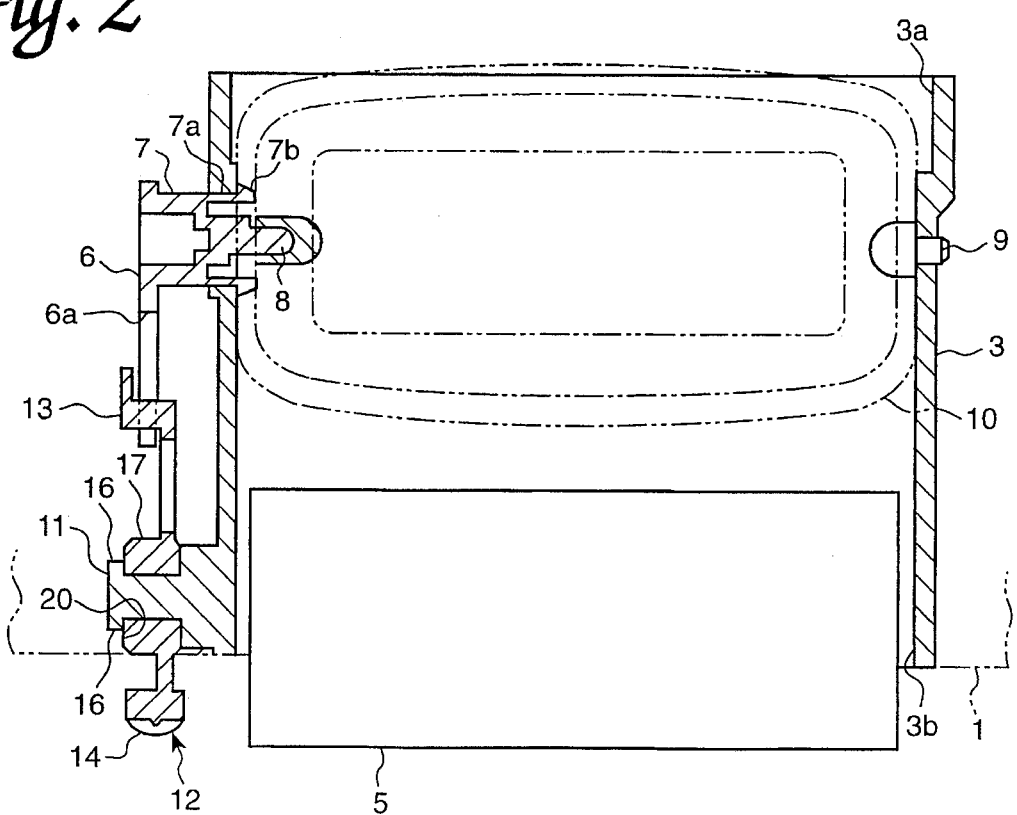
FIG. 2 is a cross-sectional view taken along the line 2—2 of FIG. 1.

A ventilation duct 3, made of polypropylene having glass fibers filled therein (hereinafter referred to as "PPF") is mounted in a instrument panel 1 of a vehicle as shown in FIGS. 1 and 2. This ventilation duct 3 is used for circulating inside air or for introducing outside air. An upstream end of the ventilation duct 3 is open, and this open end serves as an introduction port 3a for both outside air and inside air. A downstream end of the ventilation duct 3 is also open, and this open end serves as an air port 3b for air being discharged into outside and inside air.

A barrel 5 for adjusting the direction of air flow is rotatable and mounted by pins 4 on those portions of opposed inner side surfaces of the ventilation duct 3 in which the air port 3b is formed. Although not shown in the drawings, both the upstream and downstream ends of barrel 5 are open. A plurality of air flow direction-adjusting plates, spaced from one another at predetermined intervals, are provided to extend between the right and left side walls of barrel 5, at the downstream portion thereof.

A pivot tube 7, formed integrally with a lever 6, is rotatable and supported on the left side wall (shown at the left side in FIG. 2) of the ventilation duct 3 at the upstream portion thereof. A pivot pin 8 is formed integrally with an inner peripheral surface of the pivot tube 7 so as to extend along the axis thereof. The pivot pin 8 extends into ventilation duct 3. A second pivot pin 9 is mounted on the rightside wall (shown at the right side in FIG. 2) of ventilation duct 3 at the upstream portion thereof, and the second pivot pin 9 is located at an opposite side from the first pivot pin 8 and is aligned therewith. The first and second pivot pins 8 and 9 are fixedly secured to opposite (left and right) ends of a shut-out damper 10, respectively. The shut-out damper 10 is rotatable integrally with the first and second pivot pins 8 and 9. The shut-out damper 10 is in the form of a generally flat plate, and is moveable between an open position (indicated in broken lines in FIG. 1) where shut-out damper 10 fully opens ventilation duct 3 and a closed position (indicated in dots-and-dash lines in FIG. 1) where shut-out damper 10 fully closes ventilation duct 3.

An inner end portion of pivot tube 7 serves as a retaining portion 7a which is deformable due to the radially inwardly flexibility thereof. A retaining pawl 7b, of a tapering configuration enlarged radially outwardly in diameter, is formed on an inner end of the retaining portion 7a. The retaining pawl 7b snaps into place and thus prevents the pivot tube 7 from pulling away from the left side wall of ventilation duct 3.

A support shaft 11 made of PPF is formed on and projects from the left side wall (shown at the left side in FIG. 2) of ventilation duct 3 at the downstream end thereof. An operating knob 12, made of ABS (acrylonitrile butadiene styrene copolymer), is rotatably and supported on support shaft 11. A key portion 13 projecting to a left side thereof is formed integrally with a distal end of the operating knob 12. The key portion 13 is slidably received in a slot 6a which is formed through lever 6, and meanders therealong. When operating knob 12 is operated, by rotation through a predetermined angle in a vertical direction, the key portion 13 moves along the slot 6a. More specifically, when operating knob 12 is rotationally operated, lever 6 is angularly moved about pivot tube 7. As a result of this rotational movement, shut-out damper 10 is rotationally operated within the range between the open position and the closed position.

An operating portion 14 of an arcuate shape is formed at the proximal end of operating knob 12, and part of operating portion 14 projects beyond the front end of instrument panel 1. A plurality of grooves 15, for preventing slippage are formed along the peripheral edge of that portion of operating portion 14 projecting beyond the front end of the instrument panel 1. These grooves 15 are provided for preventing slipping when the operating portion 14 is operated by hand.

Important portions of this embodiment will now be described in detail as follows.

Figure 3:
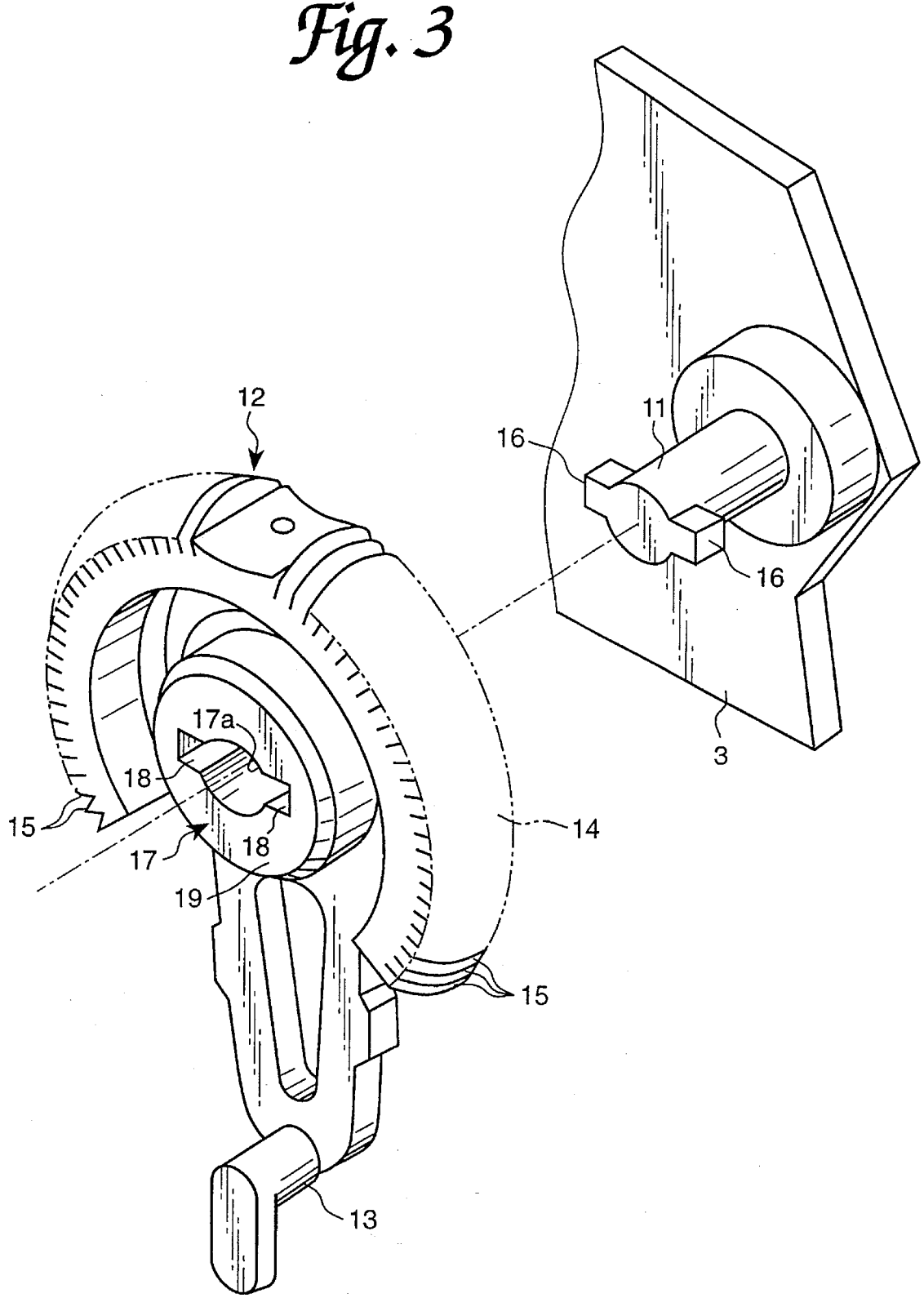
FIG. 3 is an exploded, perspective view of the operating knob and the support shaft.

Projections 16, projecting respectively in opposite directions as engagement portions, are formed on the outer peripheral surface of support shaft 11, at the distal end thereof, as best shown in FIG. 3. The projections 16 project radially outwardly from the support shaft 11 and have an inwardly directed surface 20 shown in FIG. 2. A boss 17, through which support shaft 11 extends, is formed substantially at the central portion of operating portion 14. A pair of opposed insertion recesses 18 are formed in an inner peripheral surface of an axial hole 17a in boss 17. The inner peripheral surface of axial hole 17a is notched radially outwardly of this hole to form insertion recesses 18. The insertion recesses 18 are so arranged that they are kept out of registry with projections 16 within the range of operational rotation of operating knob 12 during its operation.

The projections 16 are engageable in insertion recesses 18, respectively, and when projections 16 are disposed in registry with insertion recesses 18, respectively, as shown in FIG. 3, boss 17 can fit on support shaft 11 along the axis thereof. When projections 16 are disposed out of registry with insertion recesses 18, respectively, projections 16, and their inner surfaces 20, are held against that portion of the outer end face 19 of boss 17 except for insertion recesses 18, and therefore operating knob 12 will not be disengaged from support shaft 11.

In this embodiment, the range of operational rotation of operating knob 12 is 70° (as at θ in FIG. 1). Within this operating angular movement range, projections 16 will not be brought into the engaging position with insertion recesses 18, respectively. Therefore, within the range of rotationally operating knob 12, the operating knob 12 will not be disengaged from support shaft 11.

A method of mounting operating knob 12 on support shaft 11 will now be described.

First, insertion recesses 18 in operating knob 12 are so positioned as to be engaged with projections 16 of support shaft 11, respectively. Then, insertion recesses 18 in boss 17 are fitted on projections 16 of support shaft 11, respectively. In this condition, operating knob 12 is moved toward the proximal end of support shaft 11 along the axis of this shaft until projections 16 pass through insertion recesses 18, respectively. Then, the operating knob 12 is rotationally moved in a predetermined direction (clockwise direction in FIG. 1), so that insertion recesses 18 are displaced relative to projections 16, respectively. As a result, projections 16 and insertion recesses 18 are disposed out of registry with each other. In this non-registered position, an inner surface 20 of each of the projections 16 is held against that portion of the outer end face 19 of boss 17 except for insertion recesses 18.

Therefore, when operating knob 12, mounted on support shaft 11 in the above-mentioned manner, is angularly moved or rotated, projections 16 prevent boss 17 from being disengaged from support shaft 11. Within the range of operational rotation of operating knob 12, projections 16 are always kept out of registry with insertion recesses 18. Therefore, within the range of operational rotation of operating knob 12, the operating knob 12 will not be disengaged from support shaft 11 along the axis thereof.

Through the use of the above structure for mounting the operating knob 12, use of a tapping screw, a washer and so on, as required in the above-mentioned conventional construction, can be omitted. The number of the component parts on reduced because of the omission of such component parts and production costs can be lowered.

Moreover, when operating knob 12 is to be mounted on support shaft 11, a cumbersome operation such as an operation of mounting a tapping screw, a washer and so on, is omitted. When insertion recesses 18 are positioned in registry with projections 16 the operating knob 12 is placed on support shaft 11 and moved axially until projections 16 pass fully through recesses 18. Knob 12 is then rotated to move, insertion recesses 18 out of registry with projections 16. Merely by doing so, operating knob 12 can be easily mounted on support shaft 12.

Since the above-mentioned parts, used in the conventional construction for angularly movably supporting the operating knob on the support shaft, are omitted, there is no risk that operating knob 12 is disengaged from support shaft 11 as a result of loosening of the tapping screw and so on.

The outer peripheral surface of boss 17 is not notched, and therefore when operating knob 12 is rotated the operating knob 12 is prevented from being displaced radially outwardly from support shaft 11 within the range of operational rotation of operating knob 12. Within range of operational rotation for knob 12, projections 16 will not be brought back into registry with insertion recesses 18 and, therefore, knob 12 is prevented from being disengaged from support shaft 12, along the axis thereof.

Figure 4:
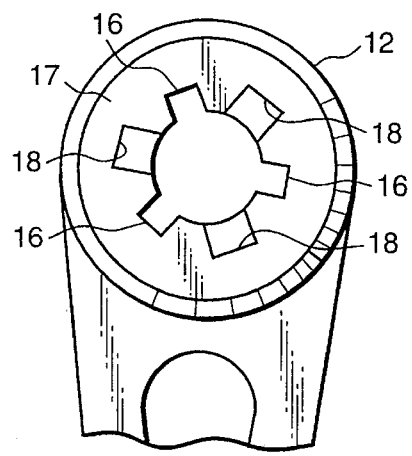
FIG. 4 is a side-elevational view of an operating knob and a support shaft in accordance with another preferred embodiment of the invention.
Figure 5:
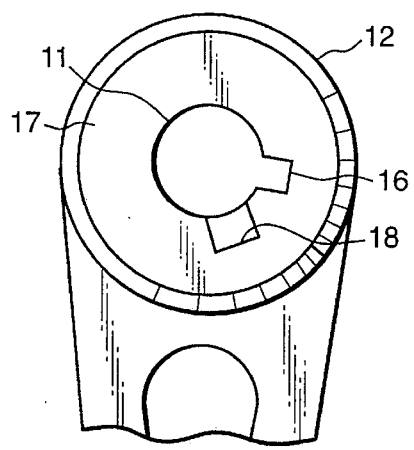
FIG. 5 is a side-elevational view of an operating knob and a support shaft in accordance with a further preferred embodiment of the invention.

The present invention is not limited to the above embodiment, and the following modifications can, for example, be made:

(a) In the above embodiment, although the pair of projections 16 and the pair of insertion recesses 18 are provided, the number of projections 16 as well as the number of insertion recesses 18 is not limited. For example, as shown in FIG. 4, three projections 16 may be formed on a support shaft 11 at equal intervals. In this case, three insertion recesses 18, in which the three projections 16 are engageable, are formed in a boss 17 at the same intervals as those for projections 16. Also, as shown in FIG. 5, one projection 16 may be formed on a support shaft 11, in which case one insertion recess 18, in which the projection 16 engageable, is formed in a boss 17.

Figure 6:
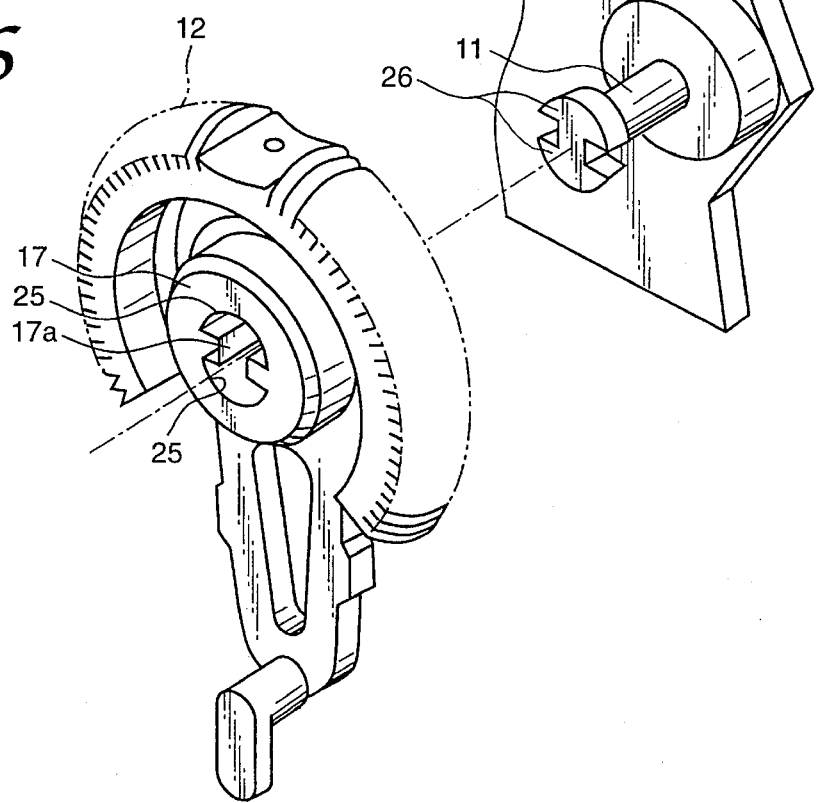
FIG. 6 is an exploded, perspective view of an operating knob and a support shaft in accordance with a still further preferred embodiment of the invention.
Figure 7:
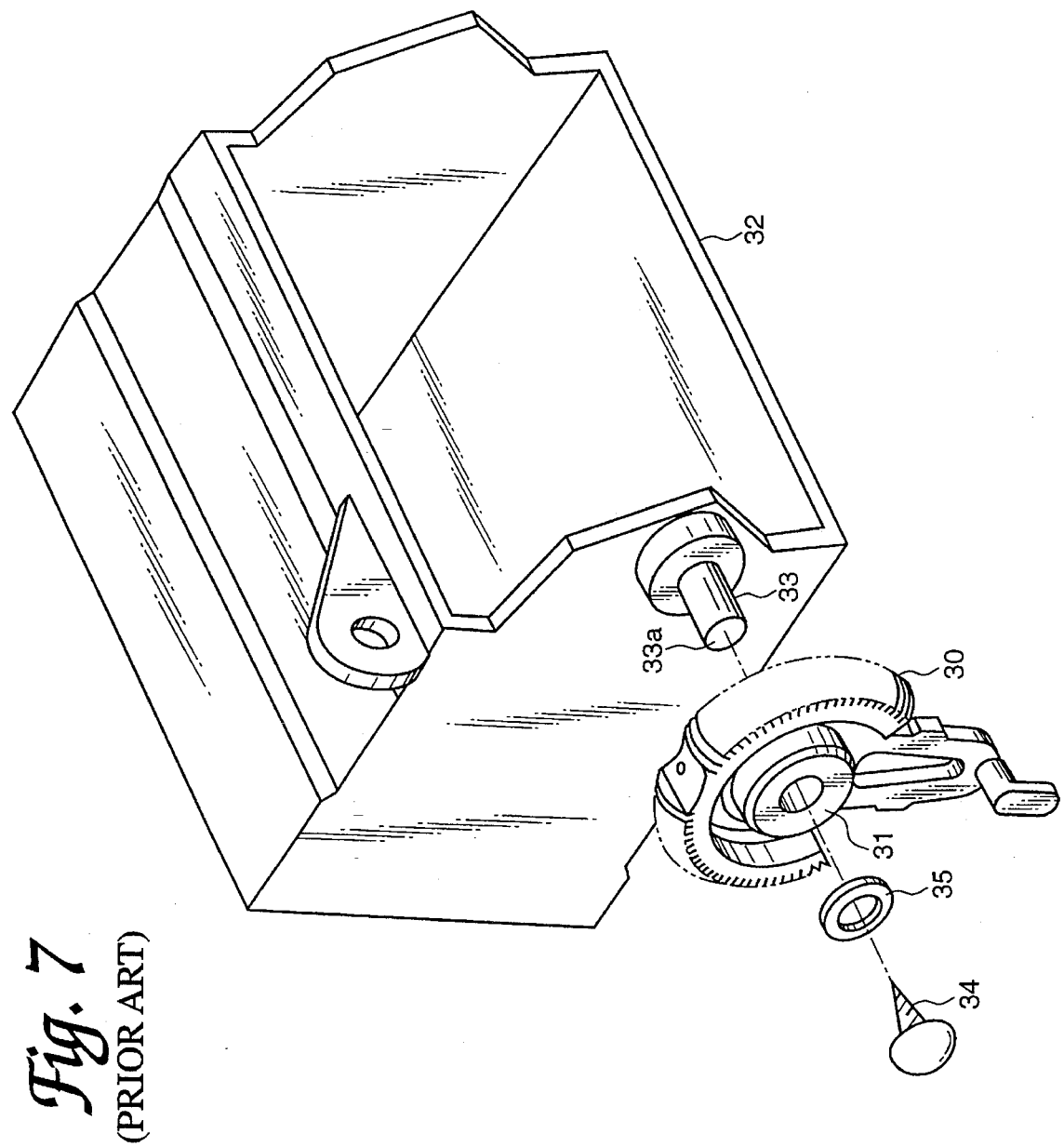
FIG. 7 is an exploded, perspective view of an operating knob and a support shaft in accordance with a conventional construction.

(b) The projections 16 and the insertion recesses 18 may have respective shapes other than those shown in the above embodiment. For example, as shown in FIG. 6, projections, or engagement portion, 26 of a semi-circular shape may be formed on a distal end of a support shaft 11, in which case insertion recesses 25 of a semi-circular shape are formed in an inner peripheral surface of an axial hole 17a in a boss 17. In this construction, boss 17 can be fitted on support shaft 11 by fitting insertion recesses 25 of boss 17 on projections 26 of support shaft 11, respectively. After boss 17 is fitted on support shaft 11, insertion recesses 25 are displaced relative to projections 26, respectively, so that insertion recesses 25 are disposed out of registry with projections 26, respectively. As a result, the projections 26 are held against the outer end face 19 of boss 17, so that boss 17 is prevented from being disengaged from support shaft 11, along the axis thereof.

(c) In the above embodiment, although projections 16 are formed on the distal end of support shaft 11, these projections may be formed on any other suitable portion of support shaft 11.

A further modified form of the invention, as well as advantageous effect of the invention, will be described below.

When one engagement portion 16 and one insertion recess 18 are provided in the operating knob-mounting structure of the invention, the range of rotational movement of the operating knob 12 can be enlarged.

As described above, the present invention is advantageous in that the number of the component parts required for mounting the operating knob on the support shaft is reduced, and the time and labor required for the operation of mounting the operating knob on the support shaft are lessened, thereby lowerly production costs. In addition, the operating knob can be easily mounted on the support shaft.

There is achieved a further advantage that within the range of rotational movement of the operating knob, the operating knob is prevented from being disengaged from the support shaft in both radial and axial directions of the support shaft.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An operating knob-mounting structure for an operating knob comprising:

a housing from which a support shaft extends outwardly, said support shaft having at least one radially extending projecting portion, said at least one projecting portion having an engagement surface;

an operating knob including a boss having first and second end surfaces, a through hole formed through said boss for receiving said support shaft, and at least one recess portion formed within said through hole for slidably receiving said at least one radially projecting portion;

a key portion projecting to either side of said operating knob and being formed integrally with a distal end of said operating knob, wherein said key portion is slidably received in a slot which is formed through a lever, and meanders therealong;

wherein said knob mounting structure is constructed and arranged to allow movement of said support shaft through said through hole and movement of said at least one radially projecting portion through said at least one recess portion, and thereafter to allow relative rotational movement between said support shaft and said boss to position said operating knob mounting structure a locked position such that said operating knob is retained by and does not disengage from said support shaft and projecting portion over an operative rotational range of movement of said operating knob, wherein said at least one radially projecting portion projects radially from said support shaft, and said at least one recess portion is disposed at a non-corresponding position to said at least one radially projecting portion within a range of operational rotation of said operating knob, such that when said operating knob is operated, said key portion moves along said slot by rotation through a predetermined angle in a vertical direction.

2. A structure according to claim 1, wherein said support shaft has two radially projecting portions formed thereon.

3. A structure according to claim 1, wherein said support shaft has three radially projecting portions formed thereon.

4. A structure according to claim 1, wherein said at least one radially projecting portion and said at least one recess portion are of a semi-circular shape.

5. A structure according to claim 4, wherein said at least one radially projecting portion is formed on a distal end of said support shaft.

6. A structure according to claim 1, wherein said boss, when operatively mounted on said support shaft, positions said at least one recess portion to be angularly offset relative to said at least one radially projecting portion.

7. A structure according to claim 1, wherein said engagement surface of said at least one projecting portion is an inner surface positioned to overlie said second surface of said boss during movement of said operating knob within a range of operational rotation.

8. A structure according to claim 1, wherein said locked position is further defined by the engagement of said first end surface of said boss adjacent said housing and by the sliding engagement of said second end surface of said boss against said engagement surface so that said operating knob structure will not be disengaged from said support shaft.

* * * * *